US009657399B2

(12) United States Patent
Leonard

(10) Patent No.: US 9,657,399 B2
(45) Date of Patent: May 23, 2017

(54) OCEAN-GOING HYDROGEN GENERATOR

(71) Applicant: Ralph L. Leonard, Charlotte, NC (US)

(72) Inventor: Ralph L. Leonard, Charlotte, NC (US)

( * ) Notice: Subject to any disclaimer, the term of this patent is extended or adjusted under 35 U.S.C. 154(b) by 48 days.

(21) Appl. No.: 14/800,726

(22) Filed: Jul. 16, 2015

(65) Prior Publication Data

US 2017/0016125 A1    Jan. 19, 2017

(51) Int. Cl.
*C25B 1/06* (2006.01)
*B63B 35/44* (2006.01)
*F03B 13/10* (2006.01)

(52) U.S. Cl.
CPC ............... *C25B 1/06* (2013.01); *B63B 35/44* (2013.01); *F03B 13/10* (2013.01); *B63B 2035/4466* (2013.01); *Y02E 60/366* (2013.01)

(58) Field of Classification Search
CPC .................... C25B 1/02–1/12; B63J 2003/046
See application file for complete search history.

(56) References Cited

U.S. PATENT DOCUMENTS

| 3,754,147 | A |  | 8/1973 | Hancock et al. |  |
|---|---|---|---|---|---|
| 4,490,232 | A |  | 12/1984 | Lapeyre |  |
| 4,495,424 | A | * | 1/1985 | Jost | F03D 9/00 290/53 |
| 6,327,994 | B1 | * | 12/2001 | Labrador | B01D 61/10 114/382 |
| 6,833,631 | B2 |  | 12/2004 | Van Breems |  |
| 6,864,596 | B2 |  | 3/2005 | Maiwald et al. |  |
| 7,352,074 | B1 |  | 4/2008 | Pas |  |
| 7,456,512 | B2 |  | 11/2008 | Nadel |  |
| 7,872,363 | B2 |  | 1/2011 | Morse |  |
| 7,948,101 | B2 |  | 5/2011 | Burtch |  |
| 8,480,381 | B2 |  | 7/2013 | Burns |  |
| 8,564,152 | B1 | * | 10/2013 | Costas | F03B 13/22 290/42 |
| 9,163,607 | B2 | * | 10/2015 | Tabe | F03B 13/262 |
| 9,248,910 | B1 | * | 2/2016 | Vander Lind | B64F 1/36 |
| 2004/0229523 | A1 | * | 11/2004 | Campbell | B63H 20/08 440/56 |
| 2008/0209234 | A1 | * | 8/2008 | Clidaras | F03B 13/1885 713/300 |
| 2009/0315330 | A1 |  | 12/2009 | Dederick |  |
| 2013/0068629 | A1 |  | 3/2013 | Bulaclac, Jr. |  |
| 2013/0101356 | A1 | * | 4/2013 | Newcomer | B63B 35/44 405/195.1 |

FOREIGN PATENT DOCUMENTS

| DE | 26 46 420 A1 | * | 4/1978 | ........... H02K 7/1823 |
|---|---|---|---|---|
| FR | 2989951 A1 | * | 11/2013 |  |
| WO | WO 2011/060183 A2 | * | 5/2011 |  |

* cited by examiner

*Primary Examiner* — Harry D Wilkins, III
(74) *Attorney, Agent, or Firm* — Hammer & Associates, P.C.

(57) ABSTRACT

An ocean-powered hydrogen generator system includes: a transportable ocean-going vessel, the vessel is movable to a location with ocean kinetic energy; a generator for converting ocean kinetic energy into electrical energy, the generator is movable on the vessel between a transport position and a generating position; a dissociator for using the electrical energy to dissociate ocean water into hydrogen and oxygen, the dissociator is located on the vessel and operatively connected to the generator; and a container for storing the generated hydrogen and oxygen on the vessel, the container is in fluid communication with the dissociator.

8 Claims, 5 Drawing Sheets

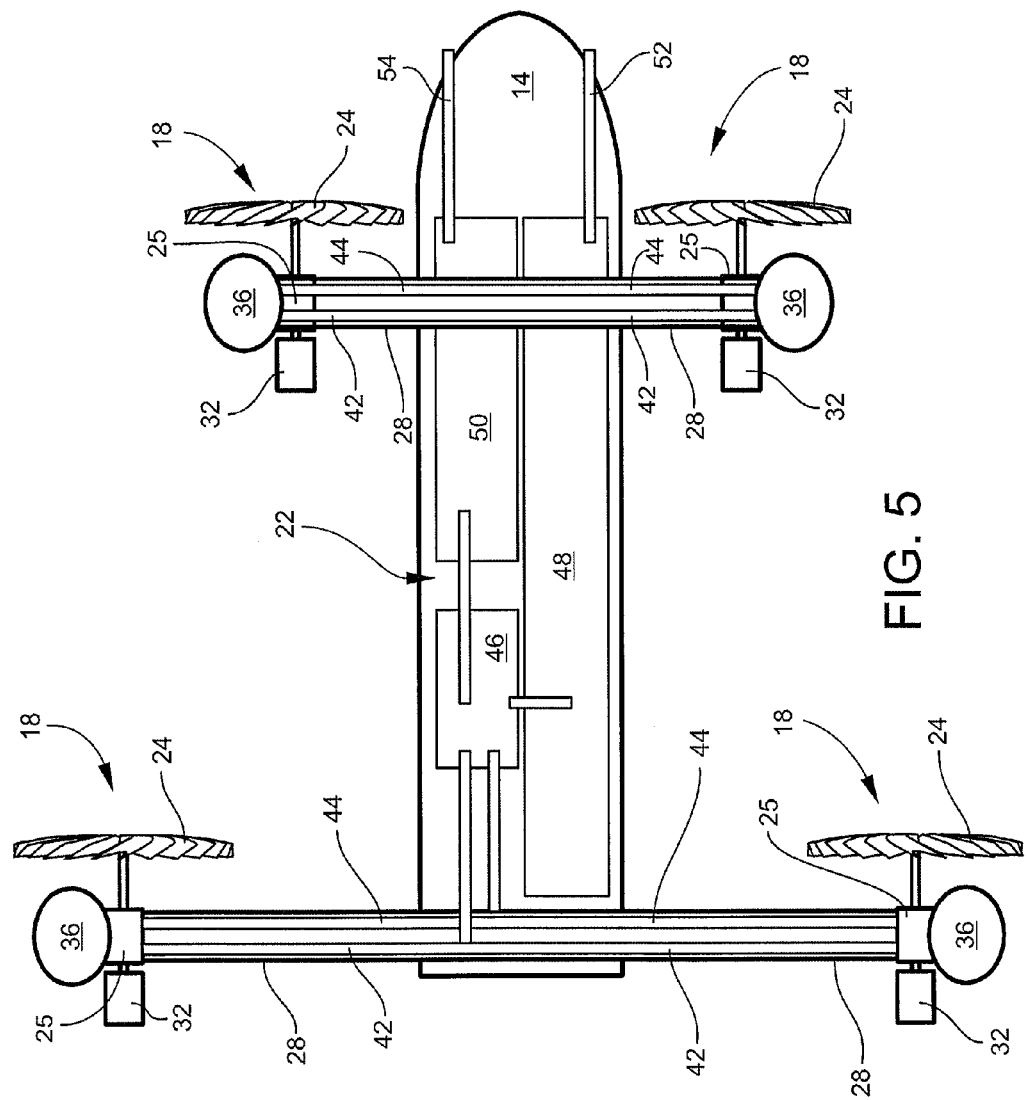

OCEAN-GOING HYDROGEN GENERATOR

FIELD OF THE INVENTION

The invention is directed to a hydrogen generator vessel in which turbines may be raised and lowered from the vessel.

BACKGROUND OF THE INVENTION

The quest for renewable energy sources is on-going. The ocean is a potentially grand source of renewable energy. For example, massive ocean storms, such as typhoons and hurricanes, are a great source of energy, but there is a need for a safe method of capturing their energy.

One should not have to wait for one of these storms to make landfall before their energy can be harnessed, so a transportable device would be best to take advantage of the numerous storms that occur over the ocean. A transportable vessel could be moved to the storm and would not have to be anchored to the ocean's bottom, the anchoring process is expensive and complicates (e.g., increases cost) the energy generating process.

Off-loading the stored energy is another consideration. Wind turbines can be used to generate electricity, but how is that electrical energy shipped back to land for use. One potential solution is the use of the electricity to dissociate water into its elemental form (hydrogen, $H_2$, and oxygen, $O_2$). This water dissociation process, electrolysis, is well known. It was demonstrated, in 1800 by William Nicholson and Anthony Carlisle, that electrolysis of water produces oxygen and hydrogen.

Accordingly, there is a need for a system that harnesses the renewable energy of the ocean with the foregoing considerations in mind.

SUMMARY OF THE INVENTION

An ocean-powered hydrogen generator system includes: a transportable ocean-going vessel, the vessel is movable to a location with ocean kinetic energy; a generator for converting ocean kinetic energy into electrical energy, the generator is movable on the vessel between a transport position and a generating position; a dissociator for using the electrical energy to dissociate ocean water into hydrogen and oxygen, the dissociator is located on the vessel and operatively connected to the generator; and a container for storing the generated hydrogen and oxygen on the vessel, the container is in fluid communication with the dissociator.

DESCRIPTION OF THE DRAWINGS

For the purpose of illustrating the invention, there is shown in the drawings a form that is presently preferred; it being understood, however, that this invention is not limited to the precise arrangements and instrumentalities shown.

FIG. 5 illustrates a top plan view of an embodiment of the invention.

DESCRIPTION OF THE INVENTION

Figure 1:
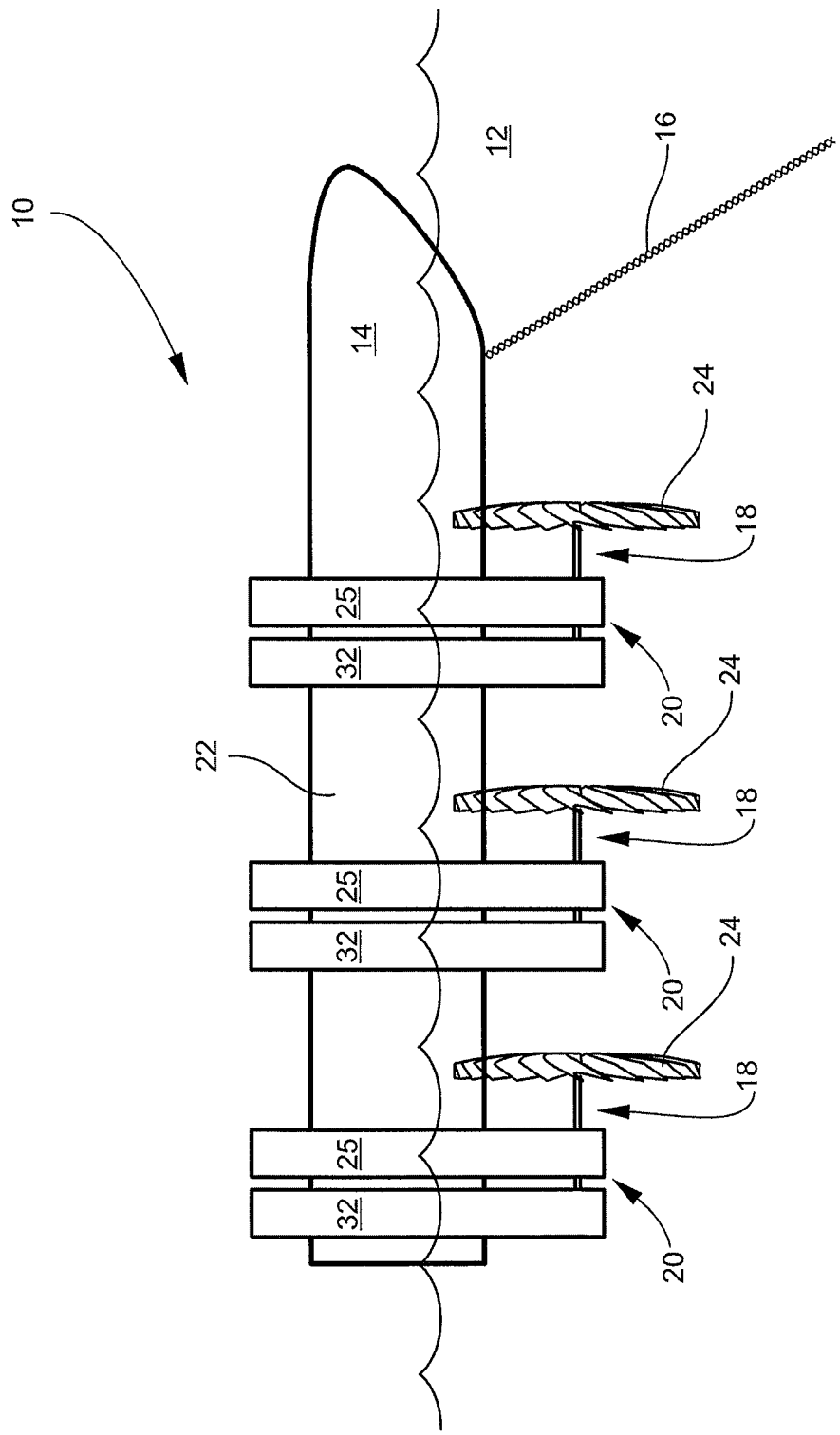
FIG. 1 illustrates a side elevational view of an embodiment of the invention.

Referring to the drawings, where like numerals indicate like elements, there is shown, in FIG. 1, an embodiment of the ocean-going hydrogen generator system 10. System 10 generally includes: a transportable vessel 14, a generator 18, a dissociator 20, and a container 22, each will be discussed in greater detail below. As shown in FIG. 1, system 10 includes a vessel 14 that is afloat on and transportable over an ocean 12 (it being understood that the invention is not limited to an ocean, but may be any sufficiently large body of water, such as an ocean, sea, lake, or river).

Figure 2:
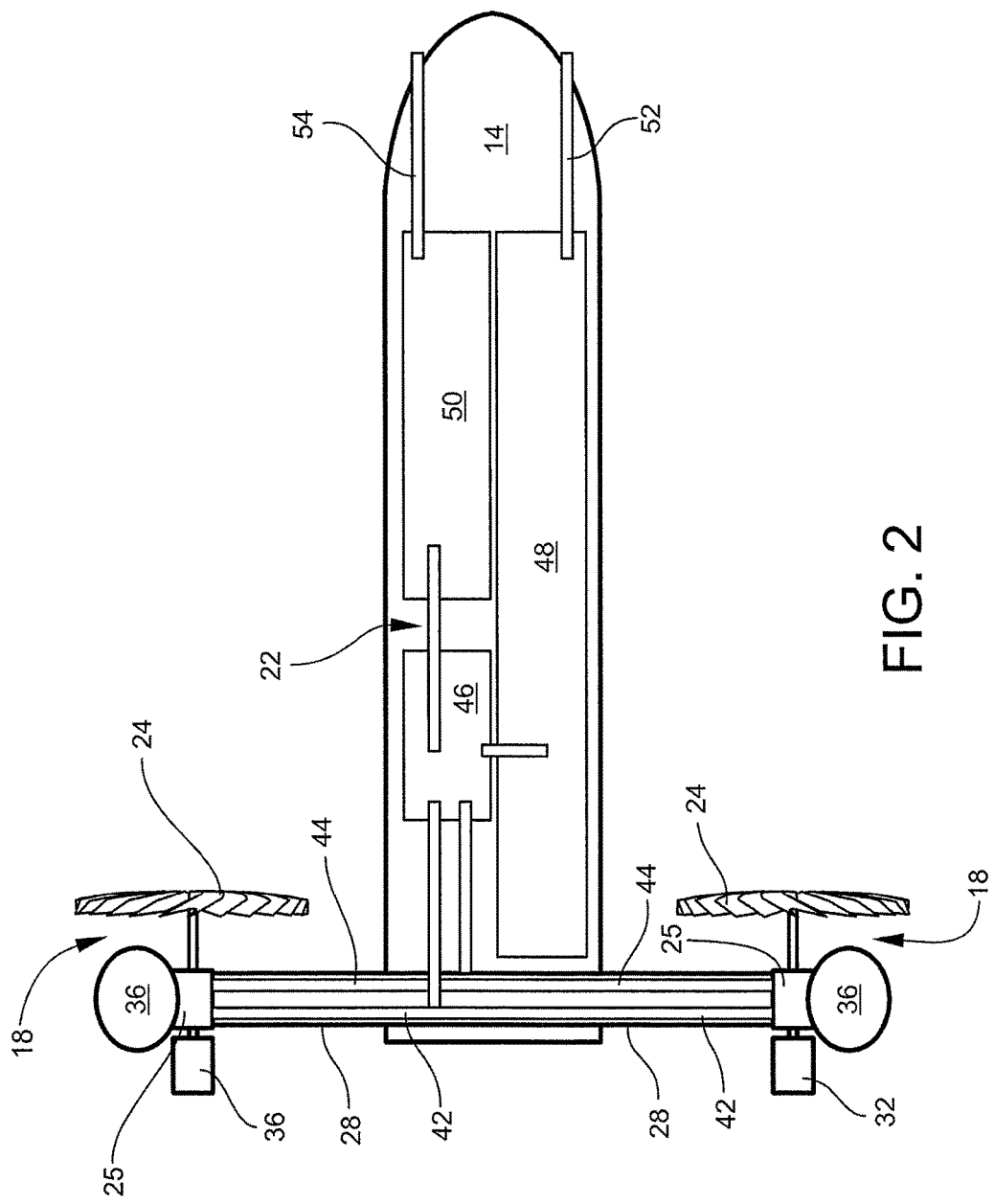
FIG. 2 illustrates a top plan view of an embodiment of the invention.
Figure 3:
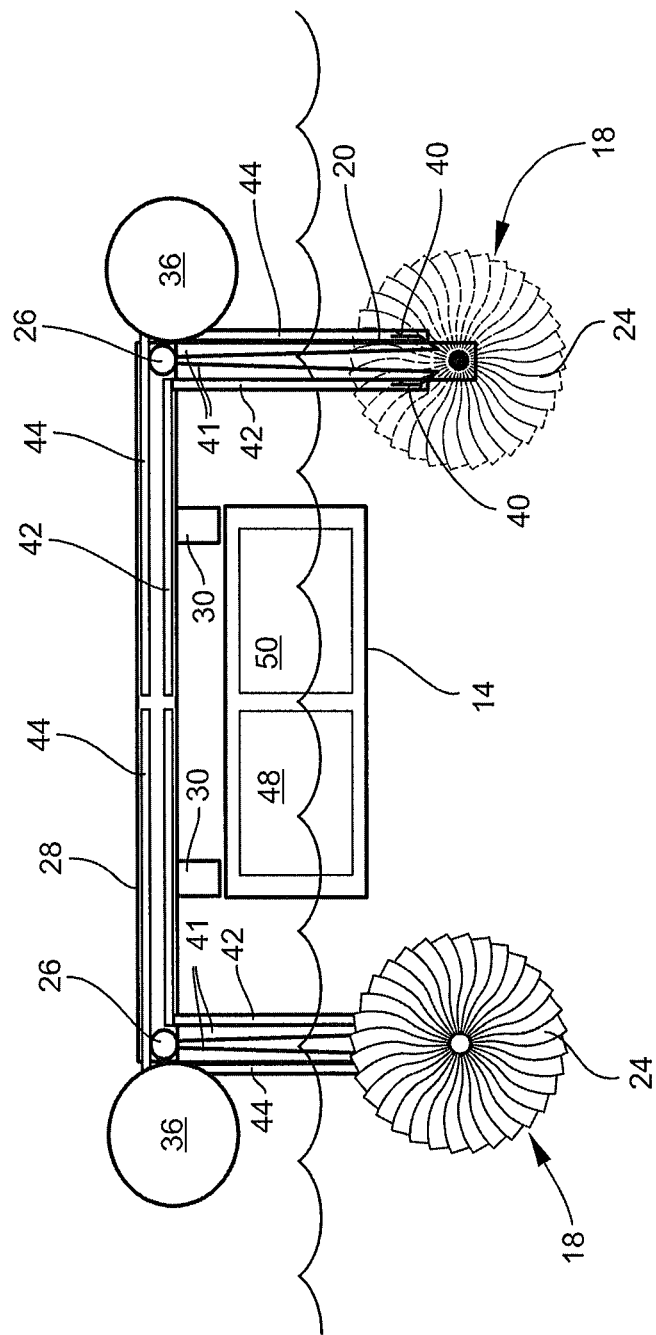
FIG. 3 illustrates a front elevation of an embodiment of the invention.

Vessel 14 may be any type of vessel. In one embodiment, for example see FIGS. 2 and 5, the vessel may be a single hull vessel, but the vessel 14 is not so limited and may be a multi-hulled vessel or a catamaran-type vessel or a barge. The vessel 14 may also include an anchor 16. Anchor 16 may be any conventional anchor for an ocean-going vessel, such as sea-anchor, drogue, drift anchor, drift sock, para-anchor, boat brake, or the like. The vessel 14 is transportable. Transportable means that the vessel 14 may be towed or driven (self-contained motive power) to various spots on the ocean.

Figure 4A:
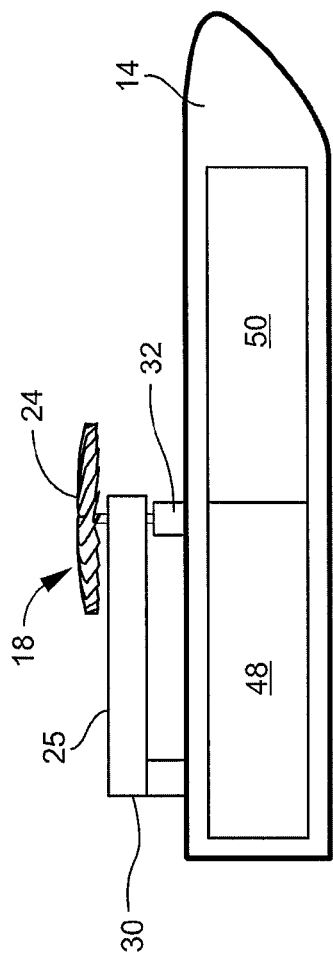
FIG. 4A illustrates a side elevational view of an embodiment with the generator in an upper position.
Figure 4B:
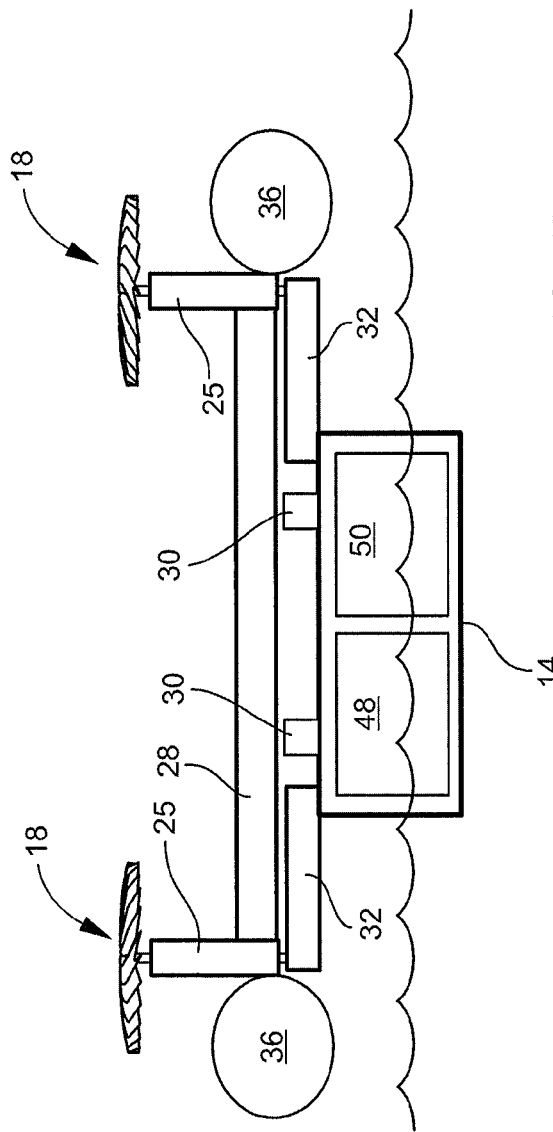
FIG. 4B illustrates a front elevational view of an embodiment with the generator in an upper position.

Generator 18 generally includes three portions: a generator; a support for the generator; and a rotator for raising and lowering the generator into and out of the ocean. An upper (or transport) position of the generator 18 is out of the ocean (see FIGS. 4A and 4B), and a lower (or generating) position of the generator 18 is in the ocean (see FIGS. 1-3 and 5).

The generator portion generally includes: a turbine 24, an electrical generator 26, and a shaft 25 interconnecting the turbine 24 and the generator 26. The turbine is located at a distal end of the shaft 25. The generator may be located at or beyond (away from the turbine 24) the proximal end of the shaft 25. The turbine 24 and generator 26 are coupled, in any conventional fashion, so that ocean kinetic energy (e.g., wave energy) may turn the turbine which in turn drives the generator 26. The generator 26 may be any type of generator. In one embodiment, the generator 26 is a direct current (DC) generator. The number of generator portions may vary, note FIGS. 1, 2, and 5. The lateral spacing of the turbines may vary, note FIGS. 1 and 5. The depth of the turbines, relative to the vessel 14, may vary (not shown).

The generator support portion provides mechanical strength to support the weight of the generator portion. Generator support portion may include a generator support 32. Generator support 32 may be pivotable (discussed in greater detail below). Generator support 32 may be located directly behind shaft 25 (e.g., first position), when the generator portion is in a lower (or generating) position, see FIGS. 1-3, and 5. Generator support 32 may be pivoted to a cross position (e.g., second position), when the generator is in an upper (or transport) position, see FIGS. 4A and 4B. Generator support 32 may be connected to the distal end of shaft 25. When the generator is lifted from the ocean, generator support 32 is pivoted (or swung), whereby the free end of generator support 32 contacts the vessel 14 and thereby supports the weight of the turbine 24 while the generator 18 is in the transport position. Pivoting of the generator support 32 may be accomplished in any conventional manner.

The rotator for raising and lowering the generator into and out of the ocean may include a turbine rotator 28 and a rotator rest 30. The rotator is used to raise and lower the generator 18 between the upper (or transport) position and the lower (or generating) position. The rotator 28 may be any conventional mechanism. In the illustrated embodiment, the rotator 28 may be connected to the proximal end of the shaft 25. Rotator 28 may sit on rest 30 which is connected to the vessel 14.

Optionally, the generator 18 may include a float 36. Float 36 may be used to assist in keeping vessel 14 righted during storms. Float 36 may be located at the proximal end of shaft 25.

Dissociator 20 uses the electrical energy from the generator 18 to dissociate water. Electrolysis is the dissociation process. Dissociator 20 generally includes: dissociation plates 40, hydrogen ($H_2$) tubing 42, oxygen ($O_2$) tubing 44, and a compressor 46, see FIG. 3. Dissociator plates 40 are in electrical communication with electrical generator 26 (e.g., via cables 41—see FIG. 3). Dissociator plates 40 may be located anywhere in system 10, so long as they submerged in operation. In the illustrated embodiment, plates 40 are located at the distal end of shaft 25. Plates 40 may have any configuration. In one embodiment, the plates may be honeycombed. The $H_2$ tubing 42 and the $O_2$ tubing 44 interconnect the plates 40 with a compressor 46. Compressor 46 is used to transport the gases from the plates 40 to the storage containers (discussed below) and may compress the gases to facilitate storage. Compressor 46 may be any conventional compressor. Compressor 46 may be located anywhere within system 10. In the illustrated embodiment, compressor 46 is located on-board vessel 14.

Container 22 is used to store the dissociated gases $H_2$ and $O_2$ prior to use. Containers 22 may be any conventional container suitable for storing a gas. Container 22 may include a $H_2$ container 48 and $O_2$ container 50. Additionally, container 22 includes off-loading ports 52 (for $H_2$) and 54 (for $O_2$).

In operation, the system 10 is moved into place, e.g., in the path of a storm, with the generator is the upper (or transport) position. Once in place, the system the generator 18 is lowered into the lower (or generating) position and the system 10 may be anchored. With the generator 18 in the lower position, ocean kinetic energy drives the turbine 24. The turbine 24 drives electrical generator 26. Electrical generator 26 powers plates 40 of the dissociator 20. Gas produced at plates 40 are conveyed, via tubing 42 and 44 and compressor 46, to containers 22. After the storm, or when the container 22 are full, system 10 may be moved to off-load the stored gases via ports 52 and 54. The off-loaded gases may be used in any conventional manner, including power generation.

The present invention may be embodied in other forms without departing from the spirit and the essential attributes thereof, and, accordingly, reference should be made to the appended claims, rather than to the foregoing specification, as indicating the scope of the invention.

I claim:

1. An ocean-powered hydrogen generator system comprises:
    a transportable ocean-going vessel, the vessel is movable to a location with ocean kinetic energy;
    a generator for converting ocean kinetic energy into electrical energy, the generator is movable on the vessel between a transport position and a generating position;
    a support for the generator, the support is pivotally affixed at a rear of the generator, the support is moveable between a lower position and a cross position, when in the cross position, the support bridges between the generator and the vessel and supports a weight of the generator, when the lower position, the support is located behind the generator;
    a dissociator for using the electrical energy to dissociate ocean water into hydrogen and oxygen, the dissociator is located on the vessel and operatively connected to the generator; and
    a container for the storing the generated hydrogen and oxygen on the vessel, the container is in fluid communication with the dissociator.

2. The system of claim 1 wherein the vessel is a single-hull vessel, a multi-hull vessel, a catamaran-type vessel, or a barge.

3. The system of claim 1 wherein the vessel includes an anchor.

4. The system of claim 1 wherein the generator further comprises a turbine coupled with an electrical generator.

5. The system of claim 1 wherein the generator further comprises a rotator for moving the generator between the transport position and the generating position.

6. The system of claim 1 wherein the generator further comprises a float for assisting in the righting of the vessel.

7. The system of claim 1 wherein the dissociator further comprises dissociation plates in operative communication with the generator and the container.

8. An ocean-powered hydrogen generator system comprises:
    a transportable ocean-going vessel, the vessel is movable to a location with ocean kinetic energy, the vessel is a single-hull vessel, a multi-hull vessel, a catamaran-type vessel, or a barge, the vessel includes an anchor;
    a generator for converting ocean kinetic energy into electrical energy, the generator is movable on the vessel between a transport position and a generating position, the generator further comprises
    a turbine coupled with an electrical generator,
    a support for the generator pivotable between a first position, when the generator is in the generating position and a second position, when the generator is the transport position, the support is pivotally affixed at a rear of the generator, when in the second position, the support bridges between the generator and the vessel and supports a weight of the generator and
    a rotator for moving the generator between the transport position and the generating position;
    a dissociator for using the electrical energy to dissociate ocean water into hydrogen and oxygen, the dissociator is located on the vessel and operatively connected to the generator, the dissociator includes dissociation plates in operative communication with the generator and the container; and
    a container for the storing the generated hydrogen and oxygen on the vessel, the container is in fluid communication with the dissociator.

\* \* \* \* \*